United States Patent [19]

Rhême

[11] Patent Number: 5,764,351
[45] Date of Patent: Jun. 9, 1998

[54] METHOD FOR THE DIFFERENTIAL MEASUREMENT OF THE ANGLE OF INCIDENCE OF A LUMINOUS BEAM AND DEVICE FOR IMPLEMENTING THE METHOD

[75] Inventor: Charles Rhême, CH-1725, Posieux, Switzerland

[73] Assignees: Optosys SA, Villars-Sur-Glane; Charles Rheme, Posieux, both of Switzerland

[21] Appl. No.: 684,185

[22] Filed: Jul. 19, 1996

[30] Foreign Application Priority Data

Jul. 19, 1995 [CH] Switzerland ............ 02 125/95

[51] Int. Cl.$^6$ ............................................. G01B 11/26
[52] U.S. Cl. ........................ 356/141.3; 356/141.2; 356/351
[58] Field of Search ..................... 356/351, 141.3, 356/141.2

[56] References Cited

U.S. PATENT DOCUMENTS

| | | |
|---|---|---|
| 3,670,168 | 6/1972 | Low et al. . |
| 3,881,105 | 4/1975 | De Lang et al. . |
| 4,624,563 | 11/1986 | Johnson . |
| 4,626,100 | 12/1986 | Johnson . |
| 4,682,024 | 7/1987 | Halldorsson et al. . |
| 4,735,507 | 4/1988 | Crane, Jr. et al. . |
| 5,182,612 | 1/1993 | Rhême . |
| 5,191,392 | 3/1993 | Johnson . |
| 5,351,124 | 9/1994 | Laskoskie et al. ............ 350/351 |

FOREIGN PATENT DOCUMENTS

D 458752  11/1991  European Pat. Off. .

*Primary Examiner*—Mark Hellner
*Attorney, Agent, or Firm*—Foley & Lardner

[57] ABSTRACT

The method for the differential measurement of an angle of incidence of a luminous beam uses a polarized light beam which is passed twice through a birefringent plate followed by a polarizing analyzer in order to obtain a succession of interference fringes. The orientation or the mutual spacing between the crests of said fringes, which are a direct function of the measured angle ($\gamma$), are analyzed by means of a suitable detector and of an electronic analyzing circuit. The measuring device comprises a single polarizing analyzer, a birefringent plate which is followed by a mirror in order to reflect the light beam through said birefringent plate a second time, and means for detecting the variations of the luminous intensity including an electronic analyzing circuit. The use of a double passage through a birefringent plate ajusts the optical elements in one plane (V) in order to optimize the efficiency and the sensitivity while measuring in the other plane (H), thus obtaining a device which is simple and at the same time very sensitive to angular displacements, for example for the measurement of vibrations.

8 Claims, 2 Drawing Sheets

METHOD FOR THE DIFFERENTIAL MEASUREMENT OF THE ANGLE OF INCIDENCE OF A LUMINOUS BEAM AND DEVICE FOR IMPLEMENTING THE METHOD

BACKGROUND OF THE INVENTION

There exist a great number of methods and/or devices for measuring an angle of incidence of a luminous beam by optical means, such as that disclosed by U.S. Pat. No. 4,626,100 which describes a wide-field measuring apparatus for the detection of the angular position of a distant laser. This device, comprising Wollaston prisms and aiming to bring highly precise measurements to perfection, is very complicated. It requires numerous optical precision elements and birefringent crystals which are cut to identical angles and thicknesses, and a rigorous alignment of these elements is indispensable for the correct operation of the apparatus.

Also known by U.S. Pat. No. 5,182,612 to the same applicant are an optical measuring method and device using a polarized light beam which is directed through a birefringent plate followed by a polarizing analyzer in order to obtain a series of interference fringes wherein the spacing between two crests of said interference fringes is a direct function of the angle to be measured.

The second cited U.S. patent already describes a method and device which are clearly simplified with respect to the state of the art know at that time. However, the use of a single birefringent plate producing a conical distribution of the beam, and therefore curved interference fringes requires a highly developed detecting apparatus and evaluating electronics, while the obtained sensitivity is limited.

SUMMARY OF THE INVENTION

Based on the background of the state of the art, it is an object of the invention to provide a method for the measurement of the angle of incidence of a luminous beam which is even simpler and more sensitive, and which allows the construction of a highly sensitive device whose space requirement is reduced with respect to known devices. This object is attained by means of a method for the measurement of the angle of incidence of a luminous beam wherein the light beam is used in its polarized form and is directed twice through a birefringent plate which is followed by a polarizing analyzer in order to obtain a series of interference fringes, and wherein the orientation or the spacing between the crests of said fringes, which are a direct function of the angle to be measured, are analyzed by means of a suitable detector and of an electronic analyzing circuit.

The invention is explained in more detail hereinafter with reference to the accompanying drawings, illustrating an embodiment of the invention by way of example.

As far as the measuring principle by means of a birefringent plate is concerned, reference is explicitly made to U.S. Pat. No. 5,182,612 (and corresponding; change "EP-A-458, 7522" to 458,752) European Patent Application No. EP-A-458,7522 to the applicant of the present invention.

DETAILED DESCRIPTION OF THE INVENTION

Figure 1:
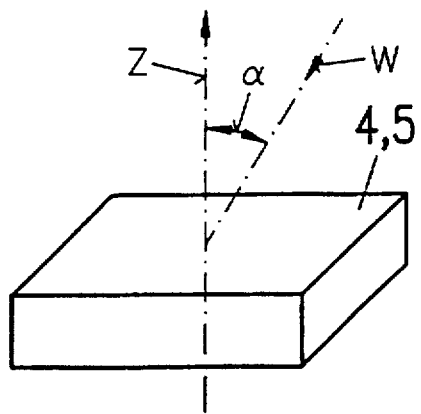
FIG. 1 schematically shows a birefringent plate.
Figure 2:
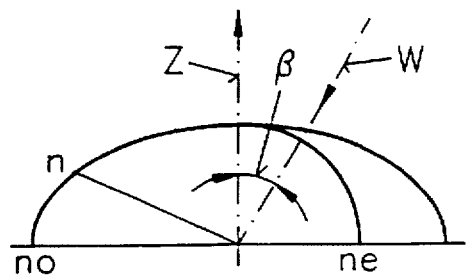
FIG. 2 shows the variation of the extraordinary index in function of the angle of incidence.

FIG. 1 shows a birefringent plate 4, 5 having an optical axis Z on which the light beam impinges at an angle of incidence a which is to be measured by means of the present invention. The light beam, which penetrates into the material at an angle $\beta$, is divided, according to the polarization, into two beams which are subject to an ordinary refractive index $n_o$ and to an extraordinary refractive index n, respectively, the latter varying between a value $n_e$ for $\beta=90°$ and the value which corresponds to the ordinary refractive index $n_o$. While the first index is constant, the second one will vary in function of the angle $\beta$ and can be calculated according to the following formula:

$$n = \frac{1}{\sqrt{\frac{\sin^2\beta}{n_e^2} + \frac{\cos^2\beta}{n_o^2}}}$$

Figure 3:
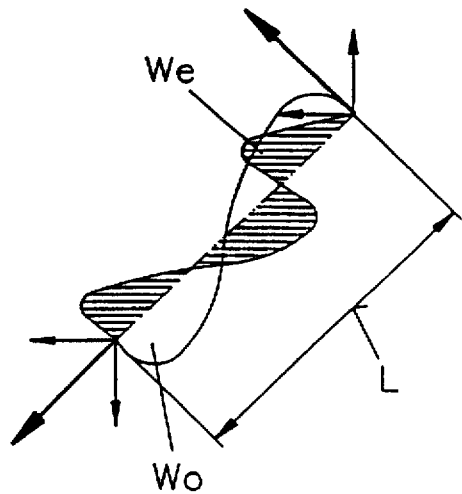
FIG. 3 shows the division of a light wave into two beams.

Let us now consider a linearly polarized light wave which is divided into an ordinary beam $W_o$ and an extraordinary beam $W_e$ which propagate at different speeds in the birefringent material (FIG. 3). After, a path producing a relative phase shift of half a wavelength, it appears that the polarization plane of the recomposed wave has been rotated by 90°, as shown schematically in FIG. 3. The length L of this path is called the half-wave plate, and it has the value:

$$L = \frac{\lambda}{2 \cdot n_o \cdot |n_o - n|}$$

wherein $\lambda$ is the wavelength of the light wave W.

Figure 4:
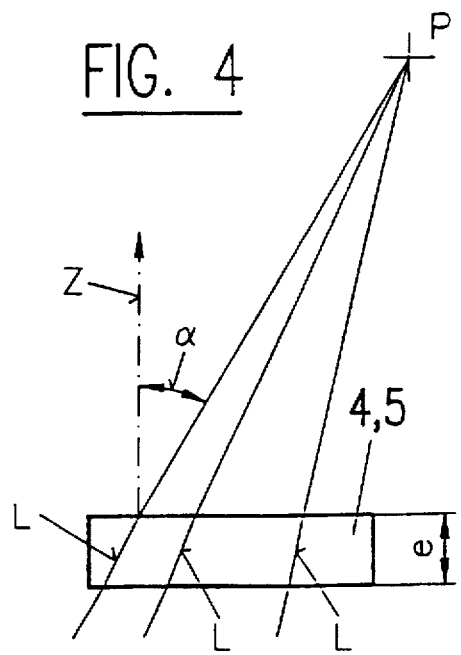
FIG. 4 schematically shows the variation of the spacing between the interference fringes with the measured angle.

The method proposed by the invention includes submitting a birefringent material to a beam of polarized light. According to the angle of incidence, the light beams will determine half-wave plates in the material. The length of these plates decreases very rapidly if the angle of the incident beam deviates from the optical axis since the value of the variable refractive index will become more and more different from the ordinary index. Every time the thickness of the material corresponds to a number which is an integer of half-wave plates, the emergent light will have a clearly defined linear polarization. Between these zones, the polarization will be of circular nature. By analyzing this light using a linear or a circular polarizer, a series of interference fringes will be observed whose mutual spacing is a direct function of the angle to be measured (FIG. 4). If the polarization of the incident beam is of a circular nature, it will become linear after having travelled a spacing which is equivalent to a quarter-wave plate. Subsequently, its behavior will be similar to the case described above.

In FIG. 4, P designates a source of polarized light, Z the optical axis, a the angle of incidence, and the birefringent plate 4, 5 having a thickness "e" is visible.

In the method according to U.S. Pat. No. 5,182,612 (and corresponding European Application No. 458,752 to the same applicant, the beam emerges from the birefringent plate in a conical distribution, thus producing curved interference fringes which have been found to be difficult to evaluate precisely. Subsequent tests have shown that the interference fringes can be made almost straight and the sensitivity to a displacement of the angle of incidence can be increased if the light beam passes through a birefringent plate twice.

Figure 5A:
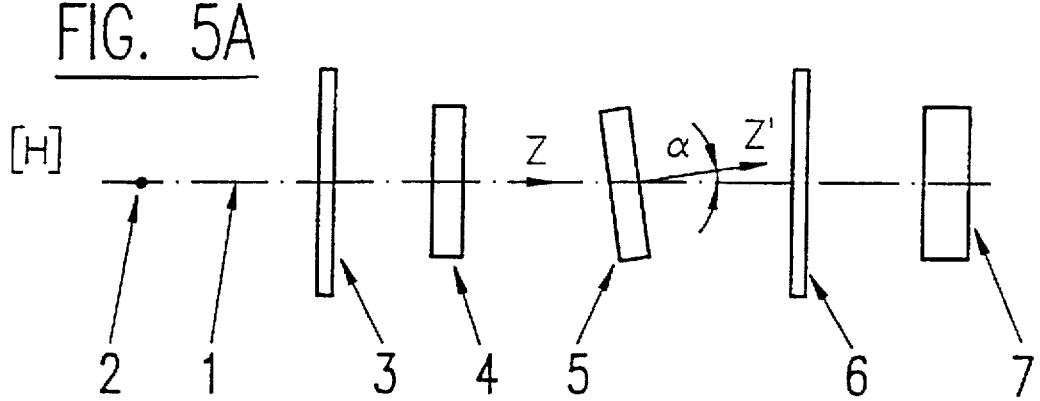
FIGS. 5A and 5B show the principle of the differential measurement of the angle of incidence.
Figure 5B:
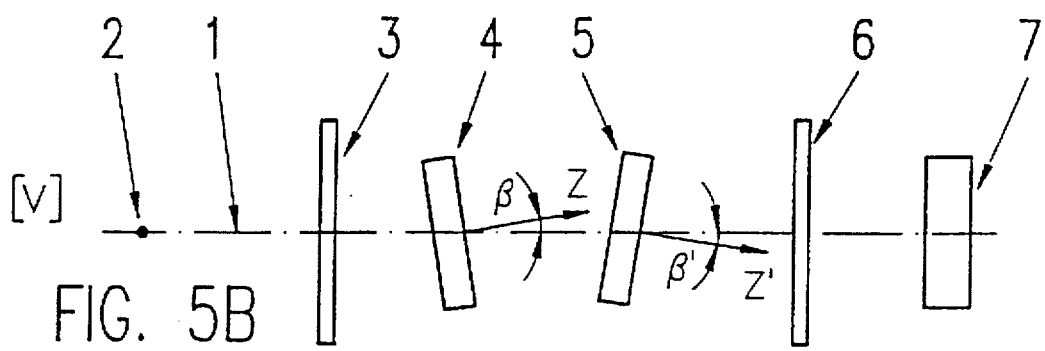

FIGS. 5A and 5B illustrate the principle of the differential measurement of the angle comprised between the optical axes Z, Z' of two birefringent plates 4, 5, by means of a light beam emitted by a point source in a horizontal plane H, FIG. 5A, and in a vertical plane V, FIG. 5B.

Light beam 1 is emitted by point source 2, which may be a light-emitting diode, and is uniformly polarized by polarizing filter 3. By passing through birefringent plate 4, this polarization will become elliptical, circular, or linear, according to the angle of the beams with respect to optical axis Z. Up to this point, the assembly including the analyzer corresponds to that of the cited patent.

As it passes through the second birefringent plate 5, the polarization of the beam will again be modified spatially as a function of the angle a formed by the beams and the optical axis Z' of the second birefringent plate 5. Analyzer 6 will produce interference fringes whose mutual spacing depends on the spacings between source 2 and the optical system and between the elements of the optical system. The inclination of the fringes depends on the angular difference a between the optical axes Z and Z' of the two birefringent plates 4 and 5.

Angles β and β', which are defined in the V plane, shall be determined and adjusted in order to obtain an optimal sharpness of the fringes and to adjust the sensitivity with respect to the angle α which is defined in the H plane. This yields useful and accurate information which may be up to 20 times more accurate and useful than the information of the first known device.

The light emitted from analyzer 6 falls on a detector 7 in the form of a CCD light transducer, for example, which analyze the orientation or the mutual spacing of the fringes using an electronic circuit in order the provide the measuring information in the desired form.

This measuring principle therefore allows an optimal adjustment of the sharpness of the interference fringes in view of an optimal analysis, and at the same time, an optimized sensitivity to the displacement of the angle α in the other plane, the displacement of said angle a corresponding to the angular displacement of an object to be measured with respect to the optical axis, and therefore with respect to the measuring apparatus.

Figure 6A:
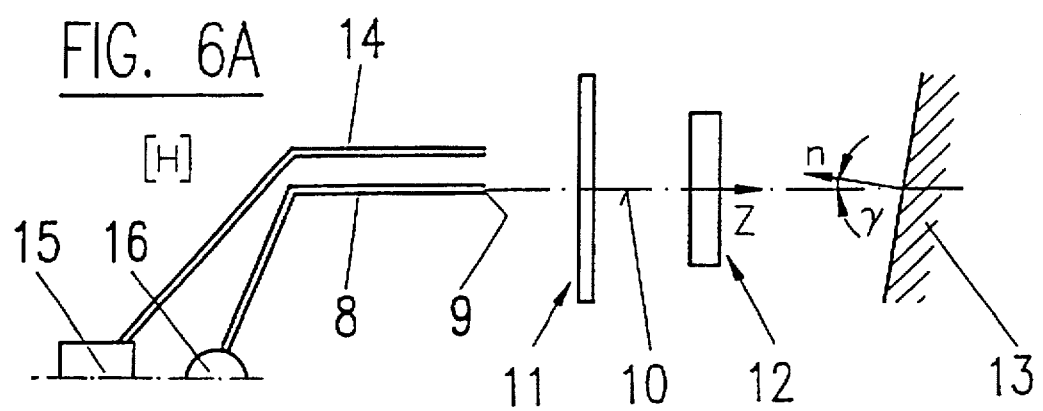
FIGS. 6A and 6B show the principle of a device for the differential measurement of the angle of incidence according to the present invention.
Figure 6B:
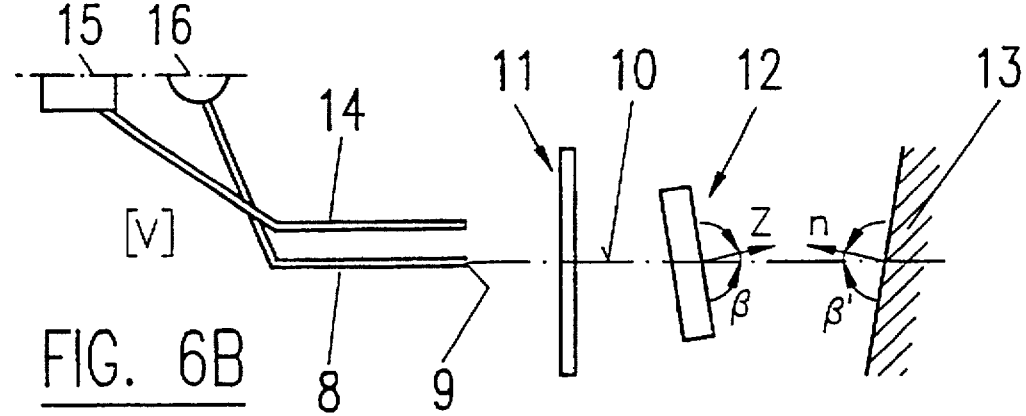

FIGS. 6A and 6B show a measuring device according to the principle of the differential measurement of an angle of incidence as described above in a schematical manner, in which an optical fiber 8 is illustrated whose end 9 forms the point source 9 of light from light source 16 emitting light beam 10 which in turn falls on a polarizing and analyzing filter 11. The uniformly polarized light beam then passes through birefringent plate 12 a first time, which produces an elliptical, circular, or linear polarization according to the angle formed by the beams and optical axis Z, and subsequently falls on a mirror 13 whose normal line n forms an angle γ with optical axis Z.

The reflected light passes through birefringent plate 12 a second time, while the polarization of this reflected beam is again spatially modified in function of the angle γ comprised between optical axis Z of birefringent plate 12 and normal line n of mirror 13.

Angles β and β', which are defined in the V plane of FIG. 6B, shall be determined and adjusted in order to obtain an optimal sharpness of the interference fringes, and in order to adjust the sensitivity with respect to the angle γ which is defined in the H plane of FIG. 6A.

The optical measuring fiber 14 collects the light of a fringe and conducts it to a detector 15 which, by measuring intensity, will produce information on the orientation of the fringe. Optical elements can be used in order to improve the optical coupling of the light and the fibers.

Such a sensitive measuring device is advantageously applicable for measuring displacements or vibrations of an object in one plane, while the displacements or vibrations, i.e. their amplitudes, deliver a signal which is capable of being processed or which may serve to monitor the operation of a machine. Due to an exclusively optical measuring head, which is insensitive to magnetic or electric fields, such a measuring device can be employed in environments whose conditions are extreme.

As a birefringent plate, a liquid crystal having birefringent properties can be used to which a variable electric field is applied in order to obtain a temporal variation of the alignment of its axis. Besides a "Polaroid=sheet, which is currently available on the market, it is also possible to use glass which is doped with metallic particles and (has the advantage) of resisting high temperatures.

It is understood that such a measuring method and device is also applicable for the measurement of a spacing between an object and the measuring device.

I claim:

1. A method for the measurement of the angle of incidence of a luminous beam, wherein a polarized luminous beam is used and is directed at least twice through a birefringent plate, after which the polarized luminous beam is directed to a polarizing analyzer in order to obtain a succession of interference fringes, and wherein an orientation or spacing between the crests of said fringes, which are a direct function of the angle to be measured, are analyzed using a detector connected to an electronic analyzing circuit.

2. The method of claim 1, wherein a mirror is disposed behind said birefringent plate in order to reflect said polarized luminous beam through said birefringent plate a second time, and wherein said polarizing analyzer polarizes the luminous beam to form said polarized luminous beam which subsequently falls upon said birefringent plate and analyzes the reflected luminous beam.

3. The method of claim 1, wherein a mirror is positioned behind said birefringent plate, and at least one of said mirror and said birefringent plate is angularly adjusted with respect to the optical axis in one plane to optimize the sharpness of the interference fringes, and wherein angular displacements of a measured object are measured in another plane.

4. The method of claim 1, wherein said birefringent plate comprises a liquid crystal having birefringent properties, and wherein a variable electric field is applied in order to obtain a temporal variation of an axis of alignment of the liquid crystal.

5. The method of claim 1, wherein said polarizing analyzer comprises a glass doped with metallic particles, said glass being resistant to high temperatures.

6. A measuring device for measuring the angle of incidence of a luminous beam, comprising a single polarizing analyzer for polarizing the luminous beam, a birefringent plate followed by a mirror, and means for detecting variations of luminous intensity, said means comprising an electronic analyzing circuit, wherein said measuring device causes said luminous beam to be directed at least twice through said birefringent plate.

7. The measuring device of claim 6, further comprising an optical fiber whose outlet forms a point source of light and is connected to a light source, and at least one optical measuring fiber to receive the reflected luminous beam, said at least one optical measuring fiber being connected to said means for detecting variations of luminous intensity.

8. The method of claim 1, wherein the polarized luminous beam is directed through at least two birefringent plates, wherein at least one of said birefringent plates is angularly adjusted with respect to the optical axis in one plane to optimize the sharpness of the interference fringes, and wherein angular displacements of a measured object are measured in another plane.

* * * * *